UNITED STATES PATENT OFFICE.

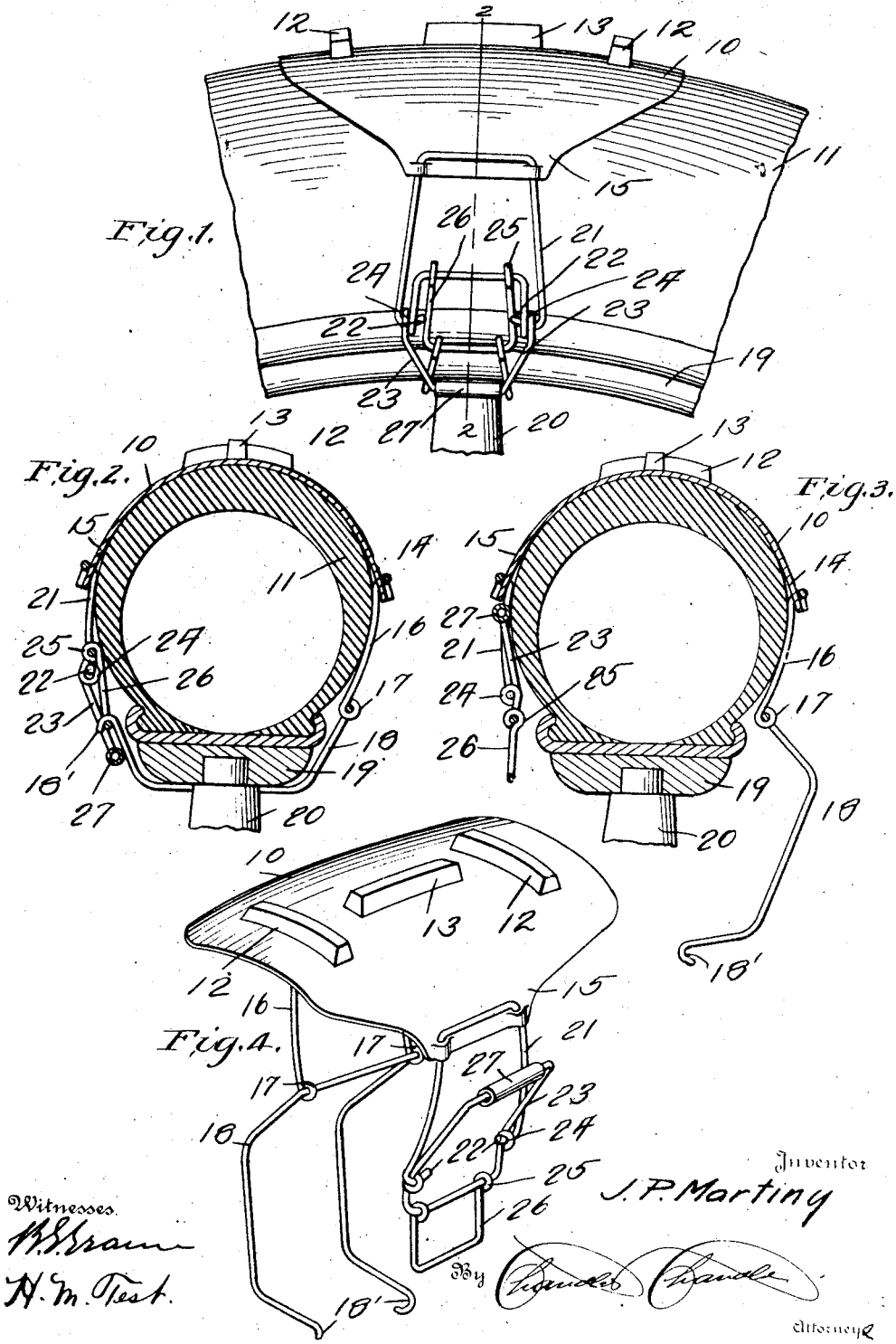

JOHN P. MARTINY, OF BIG RAPIDS, MICHIGAN.

ANTISKID DEVICE FOR AUTO-TIRES.

1,225,839.           Specification of Letters Patent.     Patented May 15, 1917.

Application filed January 18, 1916. Serial No. 72,318.

*To all whom it may concern:*

Be it known that I, JOHN P. MARTINY, a citizen of the United States, residing at Big Rapids, in the county of Mecosta, State of Michigan, have invented certain new and useful Improvements in Antiskid Devices for Auto-Tires; and I do hereby declare the following to be a full, clear, and exact description of the invention, such as will enable others skilled in the art to which it appertains to make and use the same.

This invention relates to improvements in anti-skid devices for automobile tires.

One object of the invention is to provide a simple and novel device which can be conveniently carried in the tool box of an automobile, and which can be quickly and easily applied to or detached from the wheel without the necessity for the use of any special tools.

Another object is to provide a device of this character which serves as a traction device as well as an anti-skidding device, and which is so constructed that it will not creep around the tire.

Other objects and advantages will be apparent from the following description when taken in connection with the acompanying drawing.

In the drawing:

Figure 1 is a side elevation of a portion of a tire and wheel showing my invention applied thereto;

Fig. 2 is a vertical section on the line 2—2 of Fig. 1;

Fig. 3 is a similar section showing the device in position to be applied or removed; and Fig. 4 is a perspective view of the device removed from the wheel.

Referring particularly to the accompanying drawing, 10 represents a curved plate of metal or other suitable material so bent as to conform to and fit over the outer longitudinal and transverse curvature of the tire 11. The intermediate portion of the plate is widened and has secured to the face thereof, adjacent the end, the two transversely extending ribs or calks 12, and the intermediate longitudinally extending calk or rib 13. The former of the blocks serve to increase the traction of the tire, while the latter or calk 13 serves to prevent anti-skidding or slide slipping. The sides of the plate are reduced as shown at 14 and 15 respectively, and secured to the former of the sides is a wire yoke 16, the arms of which depend at one side of the tire and are provided with eyes 17 which pivotally receive the intermediate or transverse portion of a yoke 18, the arms of which are bowed and extend under the felly 19 of the wheel, in straddling relation to the spoke 20. As shown, the outer ends of the arms of the yoke 18 are bent to provide hoops 18'.

Connected to the other side 15 of the plate 10 is a yoke 21 which extends radially at the side of the tire, and has the end of its radial arms inturned toward each other as indicated at 22 to provide fulcrums. A yoke member 23 has the intermediate portions of its arms formed with the eyes 24 which are rotatably mounted on the said inturned portions 22 of the yoke 21. The transverse portion of the yoke 23 is engaged through the eyes 25 of a small yoke 26, the intermediate portion of which is detachably engaged with the hook portions of the arms of the yoke 18. The ends of the arms of the yoke 23 are inturned and disposed within a tubular hand grip 28.

In applying the device to a wheel, the plate 10 is moved over the tread of the tire and the arms of the yoke 18 passed under the felly 19. The transverse portion of the yoke 26 is then engaged with the hooks 18' and the yoke 23 swung inwardly of the wheel on the inturned portions 22 as its pivot. This will tend to draw the yoke 26, and the inner end of the yoke 21 in a direction toward each other, thus bringing the connecting point between the yokes 23 and 26 outwardly beyond the portions 22, whereby the device is firmly tightened and clamped onto the tire and felly. To remove the device it is only necessary to swing outwardly on the yoke 23 and then disengage the yoke 26 from the hooks 18'.

From the foregoing it will be seen that I have provided an extremely simple device of this character which can be quickly and easily applied to or removed from an automobile wheel, without the aid of any special tools. The device is of such convenient construction that a dozen or more can be carried in the tool box of the automobile.

What is claimed is:

A tightening device for bands having spaced eyes at each end consisting of, a yoke member arranged to pass through one pair of said eyes and having eyes at the ends of its legs, a second yoke member having a bight portion passing pivotally through the eyes of the first yoke and having parallel legs each bent twice in the same direction to provide central portions adapted to lie beneath a wheel rim and end portions adapted to lie at the sides of such a rim, the ends of said legs being provided with hooks, a third yoke member adapted to extend through the remaining eyes of the element and having inwardly directed ends on its legs, a yoke lever having its sides pivotally supported on the ends of the third yoke member, and a yoke member swingingly connected to one end of said lever and having its bight portion engageable with the hook ends of the second member, the outer free end of the lever being movable to a position inwardly of a line drawn through its pivotal axis and the pivotal axis of the last mentioned yoke.

In testimony whereof, I affix my signature, in the presence of two witnesses.

JOHN P. MARTINY.

Witnesses:
JOSEPH BARTON,
E. W. HUDNUTT.